(12) United States Patent
Takakuwa et al.

(10) Patent No.: US 8,320,731 B2
(45) Date of Patent: Nov. 27, 2012

(54) INFORMATION REPRODUCING DEVICE AND METHOD, AND COMPUTER PROGRAM

(75) Inventors: Nobuyuki Takakuwa, Saitama (JP); Yasuko Fukuda, Saitama (JP)

(73) Assignee: Pioneer Corporation, Tokyo (JP)

( * ) Notice: Subject to any disclaimer, the term of this patent is extended or adjusted under 35 U.S.C. 154(b) by 824 days.

(21) Appl. No.: 12/095,227

(22) PCT Filed: Nov. 22, 2006

(86) PCT No.: PCT/JP2006/323346
§ 371 (c)(1),
(2), (4) Date: Jul. 21, 2008

(87) PCT Pub. No.: WO2007/063761
PCT Pub. Date: Jun. 7, 2007

(65) Prior Publication Data
US 2010/0003014 A1   Jan. 7, 2010

(30) Foreign Application Priority Data
Nov. 29, 2005 (JP) ................................. 2005-343728

(51) Int. Cl.
*H04L 29/06* (2006.01)
(52) U.S. Cl. .................... 386/219; 386/211; 386/232
(58) Field of Classification Search .................. 386/48, 386/98, 126
See application file for complete search history.

(56) References Cited

U.S. PATENT DOCUMENTS

| | | | |
|---|---|---|---|
| 5,847,770 A | 12/1998 | Yagasaki | |
| 6,067,400 A | 5/2000 | Saeki et al. | |
| 7,751,684 B2 * | 7/2010 | Miyashita et al. | 386/278 |
| 2004/0148456 A1 | 7/2004 | Seo et al. | |
| 2005/0078947 A1 | 4/2005 | Chung et al. | |
| 2005/0152682 A1 | 7/2005 | Kang et al. | |
| 2005/0185928 A1 | 8/2005 | Kang et al. | |
| 2005/0196143 A1 | 9/2005 | Kato et al. | |
| 2005/0254363 A1 | 11/2005 | Hamada et al. | |
| 2006/0204228 A1 | 9/2006 | Kang et al. | |
| 2006/0216000 A1 | 9/2006 | Kang et al. | |

FOREIGN PATENT DOCUMENTS

JP   9-154063   6/1997

(Continued)

OTHER PUBLICATIONS

European Patent Office issued an European Search Report dated Apr. 27, 2010, Application No. 06833168.5.

*Primary Examiner* — Brandon Hoffman
*Assistant Examiner* — Michael D Anderson
(74) *Attorney, Agent, or Firm* — Young & Thompson

(57) ABSTRACT

An information reproducing apparatus (200) is provided with: a displaying device (353) for displaying a main picture and a sub-picture of a first type whose display can be started at a desired reproduction time point; a storing device (355, 360) for storing an identification number of the sub-picture; a first controlling device (354, 359) for destroying the identification number of the sub-picture, if a current reproduction time point of the main picture is beyond a range of reproduction time points in which the sub-picture is to be displayed; and a second controlling device (354, 359) for continuing to store the identification number of the sub-picture, if the current reproduction time point of the main picture is not beyond the range of reproduction time points in which the sub-picture is to be displayed.

11 Claims, 11 Drawing Sheets

FOREIGN PATENT DOCUMENTS

| | | |
|---|---|---|
| JP | 2002-77784 | 3/2002 |
| JP | 2002-238032 | 8/2002 |
| JP | 2003-333504 | 11/2003 |
| JP | 2004-304767 | 10/2004 |
| JP | 2004-328450 | 11/2004 |
| JP | 2005-204315 | 7/2005 |
| JP | 2005-269595 | 9/2005 |
| WO | WO 2005013616 A1 * | 2/2005 |

* cited by examiner

FIG. 2

10: Title table

| Title number | Pointer to object |
|---|---|
| 1 | Pointer to play list (for title #1) — 12 |
|  | ... |
|  | Pointer to play list (for title #1) — 12 |
| 2 | Pointer to play list (for title #2) |
|  | ... |
|  | Pointer to play list (for title #2) |
| ... | ... |
| n | Pointer to play list (for title #n) |
|  | ... |
|  | Pointer to play list (for title #n) |
| Other information — 13 | |

FIG. 3

30: Play list (for title #m)

| | |
|---|---|
| Play item #1 | Reproduction start position (IN position) |
| | Reproduction end position (OUT position) |
| Play item #2 | Reproduction start position (IN position) |
| | Reproduction end position (OUT position) |
| ... | ... |
| Play item #I | Reproduction start position (IN position) |
| | Reproduction end position (OUT position) |
| Other information | |

31 — (play items)
32 — Other information

FIG. 5

| | | 30: Play list (for Title#m) | | | |
|---|---|---|---|---|---|
| Play item #1 | First picture information | Pointer to AV convent file | | | |
| | | Stream number information | Stream number #1 | | |
| | | | ... | | |
| | | | Stream number #i | | |
| | Second picture information | Pointer to AV convent file | | | |
| | | PinP type | Sync type | Stream number #i+1 | Reproduction start time point |
| | | | | | Reproduction end time point |
| | | | | ... | |
| | | | | Stream number #j | Reproduction start time point |
| | | | | | Reproduction end time point |
| | | | ASync type | Stream number #i | |
| | | | | ... | |
| | | | | Stream number #i | |
| ... | ... | | | | |
| Play item #p | ... | | | | |
| Other information | | | | | |

31 (Play item #1 bracket), 32 (Other information bracket)

400 # INFORMATION REPRODUCING DEVICE AND METHOD, AND COMPUTER PROGRAM

TECHNICAL FIELD

The present invention relates to an information reproducing apparatus for and method of performing reproduction on an information recording medium, such as an optical disc, and a computer program which makes a computer function as such an information reproducing apparatus.

BACKGROUND ART

As a next-generation optical disc of a DVD, which is becoming popular, a Blu-ray Disc is under development. In the Blu-ray Disc, a blue laser beam is used to record and reproduce record data, wherein the blue laser beam has a shorter wavelength than that of a red laser beam, which is used to record and reproduce the record data on a DVD. Moreover, by shortening the pitch of tracks formed on a recording surface, the Blu-ray Disc attains a recording capacity of about 23 GB in a signal recording layer (refer to patent documents 1 to 3).

On the other hand, a sub-picture, such as a small window, can be displayed with it superimposed on a main picture (in other words, superimposed on one portion of the main picture), such as a movie, recorded on the optical disc described above. As the sub-picture, there are a sub-picture of a Synchronous type (hereinafter referred to as a "Sync type") and a sub-picture of an Asynchronous type (hereinafter referred to as an "Async type"), in accordance with its display method. In the sub-picture of the Sync type, a display start time point and a display end time point are set in advance with respect to a reproduction time point of the main picture. On the other hand, in the sub-picture of the Async type, the display can be arbitrarily started, in accordance with a user's instruction or the like.

In this case, in order to identify the sub-picture currently selected as the display target from a plurality of types of sub-pictures recorded on the optical disc, a stream number of the selected sub-picture is held in a status register or the like. The stream number held in the status register continues to be held in the status register as long as a new sub-picture is not selected.

Patent document 1: Japanese Patent Application Laid Open NO. 2004-304767
Patent document 2: Japanese Patent Application Laid Open NO. 2004-328450
Patent document 3: Japanese Patent Application Laid Open NO. 2005-269595

DISCLOSURE OF INVENTION

Subject to be Solved by the Invention

In case of the sub-picture of the Sync type, even if the stream number continues to be held in the status register, there is no particular disadvantage in displaying the sub-picture because the display start time point and the display end time point are set in advance. However, in case of the sub-picture of the Async type, if the stream number continues to be held, the following technical problem can occur. For example, it is assumed that the main picture is rewound or the like while the sub-picture of the Async type is displayed. At this time, even if a reproduction time point at which the rewind is ended is a time point at which the display of the sub-picture is not originally desired, the sub-picture is displayed at an unexpected reproduction time point because the stream number is held in the status register and because the sub-picture is of the Async type in which the display can be started from an arbitrary reproduction time point, which is the technical problem that can occur.

The subject to be solved by the present invention includes the aforementioned problem as an example. It is therefore an object of the present invention to provide an information reproducing apparatus and method, which can preferably display a sub-picture which is superimposed and displayed on a main picture, and a computer program which makes a computer function as such an information recording apparatus.

Means for Solving the Subject

The above object of the present invention can be achieved by an information reproducing apparatus provided with: a displaying device for displaying a main picture and a sub-picture of a first type, which is superimposed and displayed on the main picture and whose display can be started at a desired reproduction time point on a reproduction time axis of the main picture; a storing device for storing an identification number of the sub-picture of the first type selected to be superimposed and displayed on the main picture; a first controlling device for controlling the storing device to destroy the identification number of the sub-picture of the first type, if a current reproduction time point of the main picture is beyond a range of reproduction time points in which the sub-picture of the first type is to be displayed; and a second controlling device for controlling the storing device to continue to store the identification number of the sub-picture of the first type, if the current reproduction time point of the main picture is not beyond the range of reproduction time points in which the sub-picture of the first type is to be displayed.

The above object of the present invention can be also achieved by an information reproducing method in an information reproducing apparatus provided with: a displaying device for displaying a main picture and a sub-picture of a first type, which is superimposed and displayed on the main picture and whose display can be started at a desired reproduction time point on a reproduction time axis of the main picture; and a storing device for storing an identification number of the sub-picture of the first type selected to be superimposed and displayed on the main picture, the information reproducing method provided with: a first controlling process of controlling the storing device to destroy the identification number of the sub-picture of the first type, if a current reproduction time point of the main picture is beyond a range of reproduction time points in which the sub-picture of the first type is to be displayed; and a second controlling process of controlling the storing device to continue to store the identification number of the sub-picture of the first type, if the current reproduction time point of the main picture is not beyond the range of reproduction time points in which the sub-picture of the first type is to be displayed.

The above object of the present invention can be also achieved by a computer program for reproduction control and for controlling a computer provided in the information reproducing apparatus of the present invention, the computer program making the computer function as at least one portion of the first controlling device and the second controlling device.

These effects and other advantages of the present invention will become more apparent from the embodiments explained below.

BRIEF DESCRIPTION OF DRAWINGS

FIG. 2 is a data structure diagram conceptually showing the logical structure of a title table.

FIG. 3 is a data structure diagram conceptually showing the logical structure of a play list.

FIG. 5 is a data structure diagram conceptually showing the logical structure of the play list in employing PinP in which a second picture, which is a sub-picture, is superimposed and displayed on at least one portion of a first picture, which is a main picture.

Figure 1:
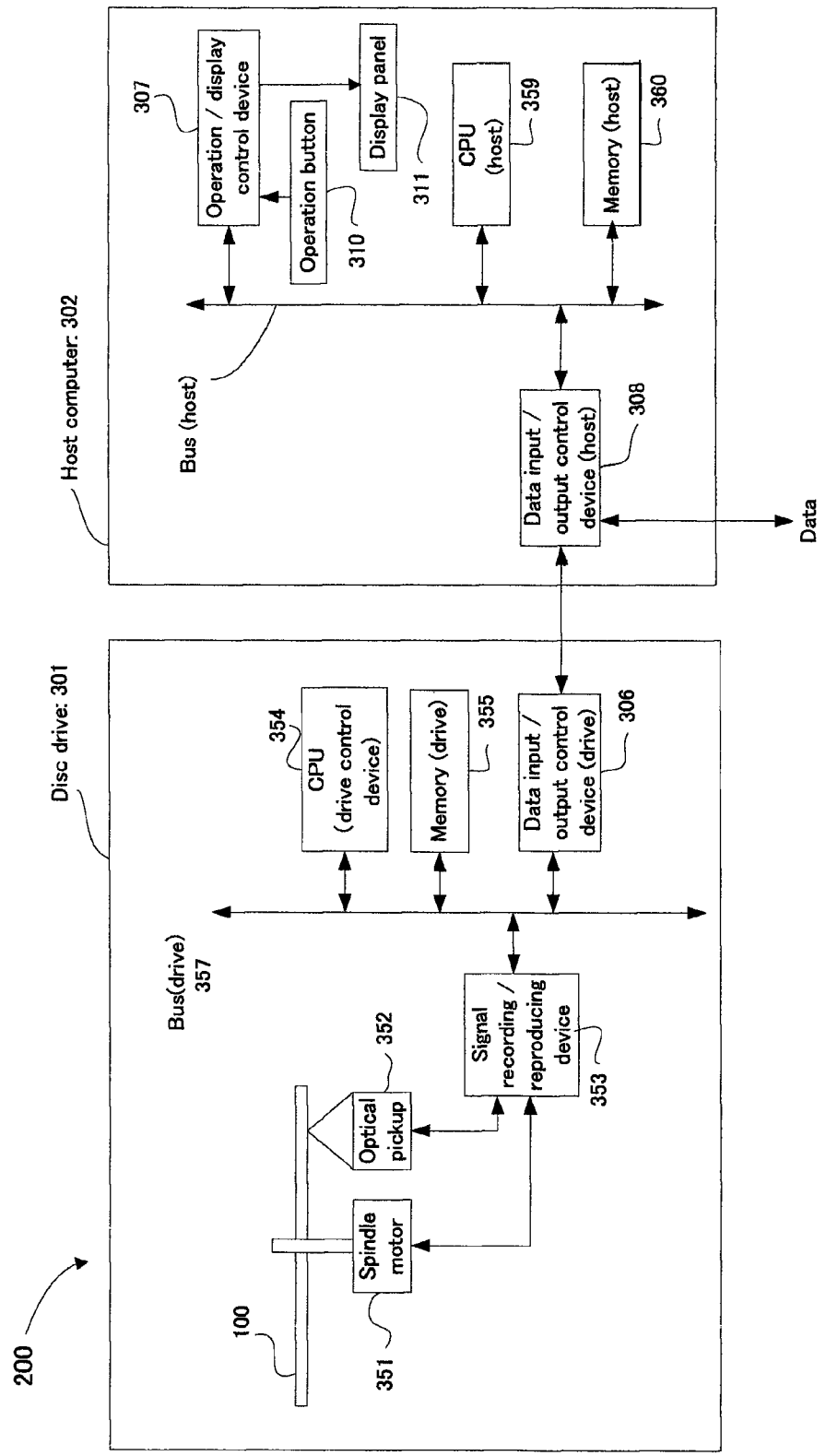
FIG. 1 is a block diagram conceptually showing the basic structure of an information recording/reproducing apparatus in an example.

DESCRIPTION OF REFERENCE CODES 10 title table
12 pointer to play list
30 play list
31 play item
100 optical disc
200 information recording/reproducing apparatus
352 optical pickup
353 signal recording/reproducing device
354, 359 CPU
355, 360 memory
Best Mode for Carrying Out the Invention Hereinafter, the best mode for carrying out the present invention will be explained in embodiments of the information reproducing apparatus and method, and the computer program of the present invention with reference to the drawings.

(Embodiment of Information Reproducing Apparatus)

An embodiment of the information reproducing apparatus of the present invention is provided with: a displaying device for displaying a main picture and a sub-picture of a first type, which is superimposed and displayed on the main picture and whose display can be started at a desired reproduction time point on a reproduction time axis of the main picture; a storing device for storing an identification number of the sub-picture of the first type selected to be superimposed and displayed on the main picture; a first controlling device for controlling the storing device to destroy the identification number of the sub-picture of the first type, if a current reproduction time point of the main picture is beyond a range of reproduction time points in which the sub-picture of the first type is to be displayed; and a second controlling device for controlling the storing device to continue to store the identification number of the sub-picture of the first type, if the current reproduction time point of the main picture is not beyond the range of reproduction time points in which the sub-picture of the first type is to be displayed.

According to the embodiment of the information reproducing apparatus of the present invention, the main picture, such as a movie, can be displayed on a display or the like by the operation of the displaying device. Moreover, by the operation of the displaying device, the sub-picture of the first type can be displayed with it superimposed on the main picture (in other words, superimposed on one portion of the main picture). The sub-picture of the first type is a sub-picture whose display can be started at the desired reproduction time point on the reproduction time axis of the main picture, and it is referred to as e.g. a sub-picture of an Async type. That is, the sub-picture of the first type is a sub-picture whose reproduction time point to start the display is not set in advance, and which can be displayed at an arbitrary reproduction time point in accordance with a user's instruction.

At this time, the identification number of the sub-picture which is the display target (for example, which is selected as the display target by the user or the like) is stored in the storing device. The displaying device superimposes and displays the sub-picture, which is specified by the identification number stored in the storing device, on the main picture.

In particular in the embodiment, by the operation of the first controlling device, the identification number of the sub-picture stored in the storing device is destroyed if the current reproduction time point of the main picture is beyond the range of reproduction time points for the sub-picture of the first type. More specifically, in the case that a reproduction time point to start the display of the sub-picture of the first type is T1 and a reproduction time point to end the display of the sub-picture of the first type is T2, if a current reproduction time point T is not within the range of T1 to T2, the identification number of the sub-picture stored in the storing device is destroyed.

On the other hand, if the current reproduction time point of the main picture is not beyond the range of reproduction time points of the sub-picture of the first type, the identification number of the sub-picture stored in the storing device continues to be stored by the operation of the second controlling device. More specifically, in the case that the reproduction time point to start the display of the sub-picture of the first type is T1 and the reproduction time point to end the display of the sub-picture of the first type is T2, if the current reproduction time point T is within the range of T1 to T2, the identification number of the sub-picture stored in the storing device continues to be stored by the operation of the second controlling device.

For example, it is assumed that the main picture is rewound, fast-forwarded, or the like in the condition that the main picture is displayed while the sub-picture of the first type superimposed thereon. In this case, if a reproduction time point at which the rewind or the fast-forwarding is ended is beyond the range of reproduction time points in which the sub-picture of the first type is to be displayed, the sub-picture of the first type is not displayed with it superimposed on the main picture when the main picture is reproduced after the rewind or the fast-forwarding is ended. On the other hand, if the reproduction time point at which the rewind or the fast-forwarding is ended is within the range of reproduction time points in which the sub-picture of the first type is to be displayed, the sub-picture of the first type is superimposed and displayed on the main picture when the main picture is reproduced after the rewind or the fast-forwarding is ended.

As described above, on the basis of the reproduction time point of the main picture and the range of reproduction time points of the sub-picture of the first type, it is possible to preferably suppress or eliminate such a disadvantage that the sub-picture of the first type is displayed at an unexpected reproduction time point or undesired reproduction time point. That is, it is possible to preferably display the sub-picture that is superimposed and displayed on the main picture.

In one aspect of the information reproducing apparatus of the present invention, the first controlling device may control the storing device to destroy the identification number of the sub-picture of the first type, if the current reproduction time point of the main picture is beyond the range of reproduction time points in which the sub-picture of the first type is to be displayed, after the sub-picture of the first type is superimposed and displayed on the main picture.

By virtue of such construction, it is possible to preferably suppress or eliminate such a disadvantage that the sub-picture of the first type is displayed at an unexpected reproduction time point or undesired reproduction time point.

In another aspect of the information reproducing apparatus of the present invention, the second controlling device may control the storing device to continue to store the identification number of the sub-picture of the first type, if the current reproduction time point of the main picture is not beyond the range of reproduction time points in which the sub-picture of the first type is to be displayed, after the sub-picture of the first type is superimposed and displayed on the main picture.

By virtue of such construction, it is possible to preferably suppress or eliminate such a disadvantage that the sub-picture of the first type is displayed at an unexpected reproduction time point or undesired reproduction time point.

In another aspect of the information reproducing apparatus of the present invention, the displaying device displays a sub-picture of a second type which is superimposed and displayed on the main picture and whose reproduction time point to start the display is set in advance with respect to the reproduction time axis of the main picture, the storing device stores the identification number of the sub-picture of the first type or the sub-picture of the second type, which is selected to be superimposed and displayed on the main picture, and the information reproducing apparatus is further provided with a third controlling device for controlling the storing device to continue to store the identification number of the sub-picture of the second type, if the sub-picture of the second type is superimposed and displayed on the main picture.

According to this aspect, by the operation of the displaying device, the sub-picture of the second type, which is different from the sub-picture of the first type, can be displayed with it superimposed on the main picture (in other words, superimposed on one portion of the main picture). The sub-picture of the second type is a sub-picture whose reproduction time point to start the display (and moreover, whose reproduction time point to end the display) is set in advance with respect to the reproduction time axis of the main picture, and it is referred to as e.g. a sub-picture of an Sync type. For the sub-picture of the second type, as in the sub-picture of the first type, the identification number of the sub-picture, which is the display target, is stored in the storing device.

Incidentally, it is preferably one sub-picture that is superimposed and displayed on the main picture. That is, if the sub-picture of the first type is superimposed and displayed on the main picture, the sub-picture of the second type is preferably not displayed. In the same manner, if the sub-picture of the second type is superimposed and displayed on the main picture, the sub-picture of the first type is preferably not displayed. Moreover, if one of a plurality of sub-pictures of the first type is superimposed and displayed on the main picture, another one of the plurality of sub-pictures of the first type is preferably not displayed. In the same manner, if one of a plurality of sub-pictures of the second type is superimposed and displayed on the main picture, another one of the plurality of sub-pictures of the second type is preferably not displayed.

Then, if the sub-picture of the second type is superimposed and displayed on the main picture, the identification number of the sub-picture stored in the storing device continues to be stored by the operation of the third controlling device. That is, since the reproduction time point or the like to start the display of the sub-picture of the second type is set in advance, even if the identification number continues to be stored as it is, there is no possibility that the sub-picture of the second type is displayed at an unexpected reproduction time point or undesired reproduction time point. Therefore, if the sub-picture of the second type is superimposed and displayed on the main picture, the identification number continues to be stored, and the sub-picture of the second type is displayed automatically or in accordance with a user's instruction.

In an aspect of the information reproducing apparatus in which the sub-picture of the second type is displayed, as described above, it may be further provided with a first judging device for judging whether the sub-picture of the first type is selected as the sub-picture to be superimposed and displayed on the main picture or the sub-picture of the second type is selected as the sub-picture to be superimposed and displayed on the main picture.

By virtue of such construction, while preferably distinguishing between the sub-picture of the first type and the sub-picture of the second type, it is possible to preferably suppress or eliminate such a disadvantage that the sub-picture of the first type is displayed at an unexpected reproduction time point or undesired reproduction time point.

In another aspect of the information reproducing apparatus of the present invention, it is further provided with a second judging device for judging whether or not the current reproduction time point of the main picture is beyond the range of reproduction time points in which the sub-picture of the first type is to be displayed, if the sub-picture of the first type is superimposed and displayed on the main picture.

According to this aspect, it is possible to preferably suppress or eliminate such a disadvantage that the sub-picture of the first type is displayed at an unexpected reproduction time point or undesired reproduction time point.

In another aspect of the information reproducing apparatus of the present invention, it is further provided with a fourth controlling device for controlling the storing device to destroy the identification number of the sub-picture of the first type, if the display of the sub-picture of the first type is ended after the sub-picture of the first type is superimposed and displayed on the main picture.

According to this aspect, by the operation of the fourth controlling device, if the display of the sub-picture of the first type is ended, the identification number stored in the storing device is destroyed, as in the case that the current reproduction time point of the main picture is beyond the range of reproduction time points for the sub-picture of the first type. Thus, it is possible to preferably suppress or eliminate such a disadvantage that the sub-picture of the first type is displayed at an unexpected reproduction time point or undesired reproduction time point.

Moreover, it may be also constructed such that the identification number of the sub-picture of the first type is destroyed if the display of the main picture is ended after the sub-picture of the first type is superimposed and displayed on the main picture.

In another aspect of the information reproducing apparatus of the present invention, the range of reproduction time points in which the sub-picture of the first type is to be displayed is a range from a reproduction time point at which the display of the sub-picture of the first type is started to a reproduction time point after a lapse of a display period of the sub-picture of the first type.

According to this aspect, it is possible to preferably suppress or eliminate such a disadvantage that the sub-picture of the first type is displayed at an unexpected reproduction time point or undesired reproduction time point.

In another aspect of the information reproducing apparatus of the present invention, the first controlling device controls the storing device to destroy the identification number of the sub-picture of the first type by storing an invalid value into the storing device.

According to this aspect, it is possible to preferably suppress or eliminate such a disadvantage that the sub-picture of the first type is displayed at an unexpected reproduction time point or undesired reproduction time point.

(Embodiment of Information Reproducing Method)

An embodiment of the information reproducing method of the present invention is an information reproducing method in an information reproducing apparatus provided with: a displaying device for displaying a main picture and a sub-picture of a first type, which is superimposed and displayed on the main picture and whose display can be started at a desired reproduction time point on a reproduction time axis of the main picture; and a storing device for storing an identification number of the sub-picture of the first type selected to be superimposed and displayed on the main picture, the information reproducing method provided with: a first controlling process of controlling the storing device to destroy the identification number of the sub-picture of the first type, if a current reproduction time point of the main picture is beyond a range of reproduction time points in which the sub-picture of the first type is to be displayed; and a second controlling process of controlling the storing device to continue to store the identification number of the sub-picture of the first type, if the current reproduction time point of the main picture is not beyond the range of reproduction time points in which the sub-picture of the first type is to be displayed.

According to the embodiment of the information reproducing method of the present invention, it is possible to receive the same benefits as those of the aforementioned information reproducing apparatus of the present invention.

In response to the various aspects of the aforementioned information reproducing apparatus of the present invention, the information reproducing method of the present invention can employ various aspects.

(Embodiment of Computer Program)

An embodiment of the computer program of the present invention is a computer program for reproduction control and for controlling a computer provided in the aforementioned information reproducing apparatus of the present invention (including its various aspects), the computer program making the computer function as at least one portion of the first controlling device and the second controlling device.

According to the computer program of the present invention, the aforementioned information reproducing apparatus of the present invention (including its various aspects) can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the aforementioned information reproducing apparatus of the present invention, the computer program of the present invention can also employ various aspects.

The above object of the present invention can be also achieved by a computer program product in a computer-readable medium for tangibly embodying a program of instructions executable by a computer provided in the aforementioned information reproducing apparatus of the present invention (including its various aspects), the computer program product making the computer function as at least one portion of the first controlling device and the second controlling device.

According to the computer program product of the present invention, the aforementioned information reproducing apparatus of the present invention can be embodied relatively readily, by loading the computer program product from a recording medium for storing the computer program product, such as a ROM (Read Only Memory), a CD-ROM (Compact Disc—Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned information reproducing apparatus of the present invention.

Incidentally, in response to the various aspects of the aforementioned information reproducing apparatus of the present invention, the computer program product of the present invention can also employ various aspects.

These effects and other advantages of the present invention will become more apparent from the example explained below.

As explained above, according to the embodiment of the information reproducing apparatus of the present invention, it is provided with the displaying device, the storing device, the first controlling device, and the second controlling device.

According to the embodiment of the information reproducing method of the present invention, it is provided with the first controlling process and the second controlling process.

According to the embodiment of the computer program of the present invention, it makes a computer function as one portion of the embodiment of the information reproducing apparatus of the present invention.

Therefore, it is possible to preferably display the sub-picture that is superimposed and displayed on the main picture.

EXAMPLE

Hereinafter, the preferred example of the present invention will be explained with reference to the drawings.

(1) Basic Structure of Information Recording/Reproducing Apparatus

Firstly, with reference to FIG. 1, a description will be given on the basic structure of an information recording/reproducing apparatus, as an example of the information reproducing apparatus of the present invention. FIG. 1 is a block diagram conceptually showing the basic structure of an information recording/reproducing apparatus 200 in the example. Incidentally, the information recording/reproducing apparatus 200 has a function of recording data onto an optical disc 100 and a function of reproducing the data recorded on the optical disc 100.

As shown in FIG. 1, the information recording/reproducing apparatus 200 is provided with: a disc drive 301 on which the optical disc 100 is actually loaded and on which data recording and data reproduction are performed; and a host computer 302, such as a personal computer, for controlling the data recording and reproduction with respect to the disc drive 301.

The disc drive 301 is provided with: the optical disc 100; a spindle motor 351; an optical pickup 352; a signal recording/reproducing device 353; a CPU (drive control device) 354; a memory 355; a data input/output control device 306; and a bus 357. Moreover, the host computer 302 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the holographic recording medium 1. More specifically, the spindle motor 351 is adapted to rotate the optical disc 100 at a predetermined speed and stop it, under spindle servo from a not-illustrated servo unit or the like.

The optical pickup 352 is provided with e.g. a semiconductor laser diode, a collimator lens, an objective lens, and the like, in order to perform the recording and the reproduction on the optical disc 100. More specifically, the optical pickup 352 irradiates the optical disc 100 with a laser beam LB with a first power as reading light in the reproduction, and with a second power and with it modulated as writing light in the recording.

The signal recording/reproducing device 353 constitutes one specific example of the "displaying device" of the present invention, and controls the spindle motor 351 and the optical pickup 352, to thereby perform the recording and the reproduction on the optical disc 100. More specifically, the signal recording/reproducing device 353 is provided with e.g. a laser diode driver (LD driver), a head amplifier, and the like. The laser diode driver generates e.g. a driving pulse and drives the semiconductor laser element disposed in the optical pickup 352. The head amplifier amplifies an output signal of the optical pickup 352, i.e. reflected light of the laser beam LB, and outputs the amplified signal.

The memory 355 is used in the general data processing and an OPC process on the disc drive 301, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as the recorder equipment, i.e. firmware, is stored; a buffer for temporary storage of the record/reproduction data; a RAM area into which a parameter required for the operation of a firmware program or the like is stored; and the like.

The CPU (drive control device) 354 is connected to the signal recording/reproducing device 353 and the memory 355 through the bus 357, and controls the entire disc drive 301 by giving an instruction to various controlling devices. Typically, software or firmware for operating the CPU 354 is stored in the memory 355.

The data input/output control device 306 controls the input/output of the data from the exterior with respect to the disc drive 301, to thereby perform storage to and export from the data buffer on the memory 355. A drive control command issued from the external host computer 302 connected to the disc drive 301 through an interface, such as a SCSI and an ATAPI, is transmitted to the CPU 354 through the data input/output control device 306. Moreover, the data is also exchanged with the host computer 302 through the data input/output control device 306, in the same manner.

The operation/display control device 307 constitutes one specific example of the "inputting device" of the present invention. The operation/display control device 307 receives an operation instruction and performs display with respect to the host computer 302, and transmits an instruction by the operation button 310, such as an instruction to record, to the CPU 359. The CPU 359 may transmit a control command to the information recording/reproducing apparatus 200, through the data input/output control device 308, on the basis of instruction information from the operation/display control device 307, to thereby control the entire disc drive 301. In the same manner, the CPU 359 can transmit a command for requesting the disc drive 301 to transmit an operational state to the host, with respect to the disc drive 301. By this, the operational state of the disc drive 301, such as during recording, can be recognized, so that the CPU 359 can output the operational state of the disc drive 301 to the display panel 311, such as a fluorescent tube and an LCD, through the operation/display control device 307.

The memory 360 is an internal memory apparatus used by the host computer 302, and it is provided with: a ROM area in which a firmware program, such as BIOS (Basic Input/Output System), is stored; a RAM area in which variables necessary for the operation of an operating system and an application program or the like are stored; and the like. Moreover, the memory 360 may be connected to an external memory apparatus, such as a not-illustrated hard disk, through the data input/output control device 308.

One specific example used by combining the disc drive 301 and the host computer 302, as explained above, is household equipment, such as recorder equipment for recording and reproducing video images. The recorder equipment records a video signal from a broadcast reception tuner and an external connection terminal, onto a disc. The operation as the recorder equipment is performed by executing a program stored in the memory 360, on the CPU 359. Moreover, in another specific example, the disc drive 301 is a disc drive (hereinafter referred to as a "drive", as occasion demands), and the host computer 302 is a personal computer and a work station. The host computer, such as the personal computer, and the drive are connected through the data input/output control devices 306 and 308, such as the SCSI and the ATAPI, and application, such as writing software, installed in the host computer 302 controls the disc drive 301.

(2) Logical Structure of Data recorded on Optical Disc

Next, with reference to FIG. 2 to FIG. 8, a description will be given on the logical structure of the data on the optical disc 100.

Figure 4:
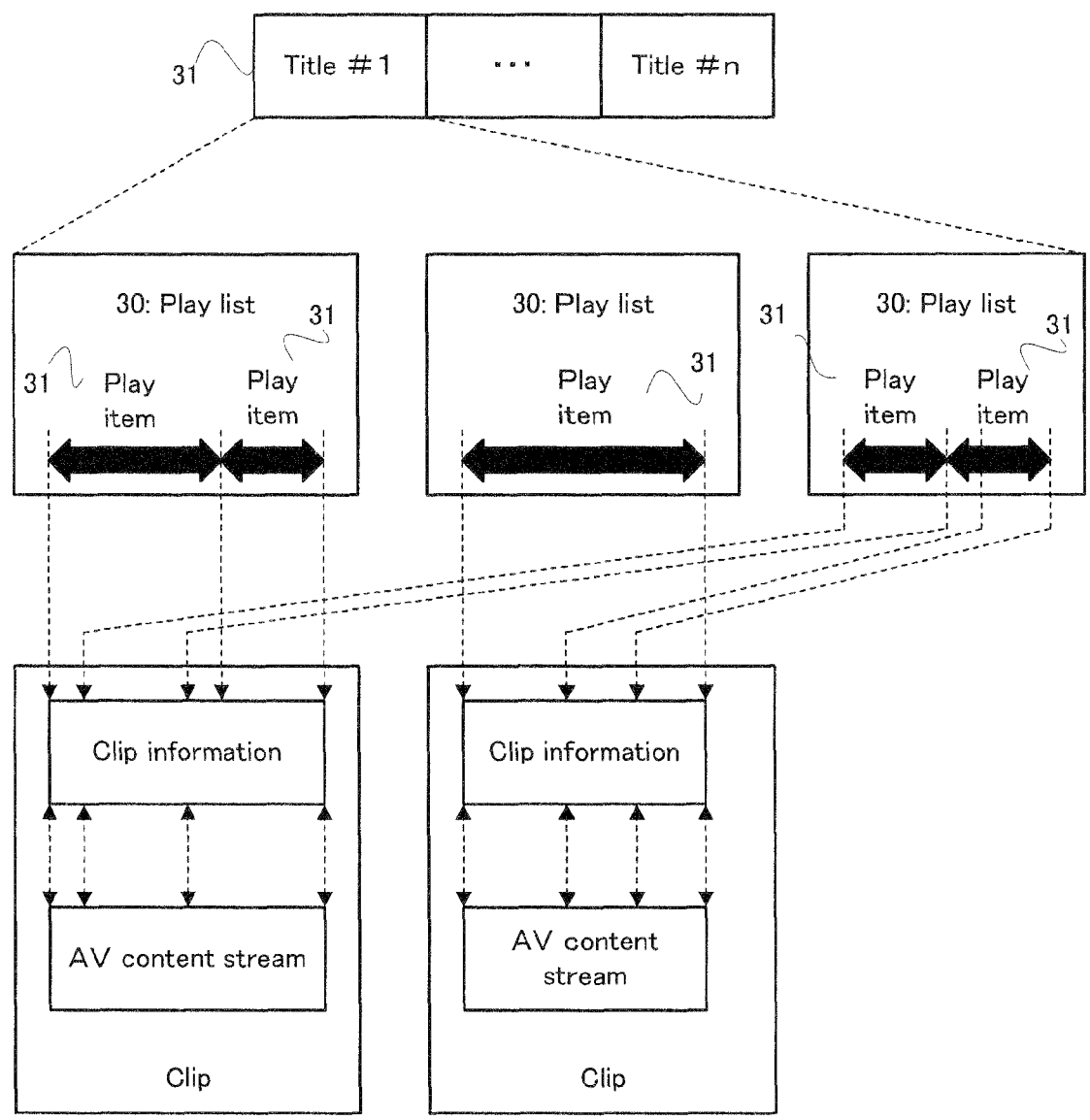
FIG. 4 is a cross sectional view showing a new optical disc and a graph showing tracking polarity.

Firstly, with reference to FIG. 2 to FIG. 4, a description will be given on the basic structure of the logical structure of the data on the optical disc 100. FIG. 2 is a data structure diagram conceptually showing the logical structure of a title table. FIG. 3 is a data structure diagram conceptually showing the logical structure of a play list. FIG. 4 is a data structure conceptually showing a hierarchy relationship of the logical structure of the data.

As shown in FIG. 2, a title table 10 is recorded on the optical disc 100, wherein the title table 10 indicates objects that constitute a plurality of titles. Here, the title is AV content unit which has a logically large group, such as one movie and one TV program. As described later, the title is an AV content reproduction unit in which a plurality of "play lists" are continuously executed.

On the title table 10, there are recorded pointers 12 which indicate the storage positions of the play lists which constitute each title (for titles #1 to #n), in each of the title numbers #1 to #n (wherein n is an integer or 1 or more) for identifying the title. Here, the "play list" is a file in which information necessary for the reproduction of the AV content is stored. As described later, the play list is provided with a plurality of "play items" in each of which information about the reproduction range of the AV content is stored to access the AV content.

Moreover, on the title table 10, there is recorded other information except the aforementioned pointers 12.

Incidentally, FIG. 2 exemplifies the title table 10 in the case where the plurality of titles are recorded on the optical disc 100. If one title is recorded on the optical disc 100, the present invention employs such construction that the pointers 12 to the playlists which constitute the one title are recorded.

Moreover, FIG. 2 exemplifies the title table 10 in which the reproduction unit which is obtained by continuously executing the plurality of play lists, is set as one title; however, it is obvious that a reproduction unit which is obtained by executing a single play list may be set as one title.

As shown in FIG. 3, the play list (for title #m (wherein 1≦m≦n)) 30, whose storage position is indicated by the pointer 12 recorded in the title table 10, includes a plurality of play items 31 and other information 32.

Each of the plurality of play items 31 includes a reproduction start position (in other words, an IN position) of the AV content and a reproduction end position (in other words, an OUT position) of the AV content. Incidentally, the reproduction start position and the reproduction end position are preferably indicated by a time stamp (i.e. a reproduction time length or a reproduction time point) on a reproduction time axis of the AV content.

Moreover, the play list 30 preferably includes the position(s) of one or a plurality of chapters included in the AV content.

As shown in FIG. 4, the data structure explained in FIG. 2 and FIG. 3 has a hierarchic relationship. That is, one title is provided with one or a plurality of play lists 30, and one play list 30 is provided with one or a plurality of play items 31.

Then, the play item 31 indicates an access point in a clip by the reproduction start position and the reproduction end position described above. Incidentally, the "clip" in the example indicates a pair of one AV content stream file (i.e. an actual data file of the AV content, for example, a MPEG 2 transport stream) and clip information, which is information corresponding thereto. Then, the data file of the clip information is referred to as a clip information file.

The reproduction start position and the reproduction end position shown as the time stamp by the play item 31 are converted to address information, at which decoding is to be started in the AV content stream file, by using the clip information file. Thus, the clip information preferably includes a table or the like which indicates a correspondence relationship between the time stamp and the address information.

For example, in FIG. 4, the title #1 shown at the first from the left is provided with three play lists 30. The first play list 30, shown on the left side in FIG. 4 of the three play lists, is provided with two play items 31. The two play items 31 refer to a former half portion and a latter half portion of an AV content stream included in the first clip shown on the left side in FIG. 4. Thus, if the first play list 30 is selected, the former half portion and the latter half portion of the AV content stream included in the first clip are reproduced.

Moreover, the second play list 30 shown on the middle side in FIG. 4 of the three play lists 30 is provided with one play item. The one play item 31 refers to an entire AV content stream included in the second clip shown on the right side in FIG. 4. Thus, if the second play list 30 is selected, the entire AV content stream included in the second clip is reproduced.

Moreover, the third play list 30 shown on the right side in FIG. 4 of the three play lists is provided with two play items 31. The two play items 31 refer to one portion of the AV content stream included in the first clip and one portion of the AV content stream included in the second clip. Thus, if the third play list 30 is selected, one portion of the AV content stream included in the first clip and one portion of the AV content stream included in the second clip are reproduced.

As described above, from the viewpoint of the logical structure of the data recorded on the optical disc 100, the information recording/reproducing apparatus 200 in the example reproduces the AV content recorded on the topical disc 100 by following the hierarchic data structure shown in FIG. 4 as needed.

Figure 6:
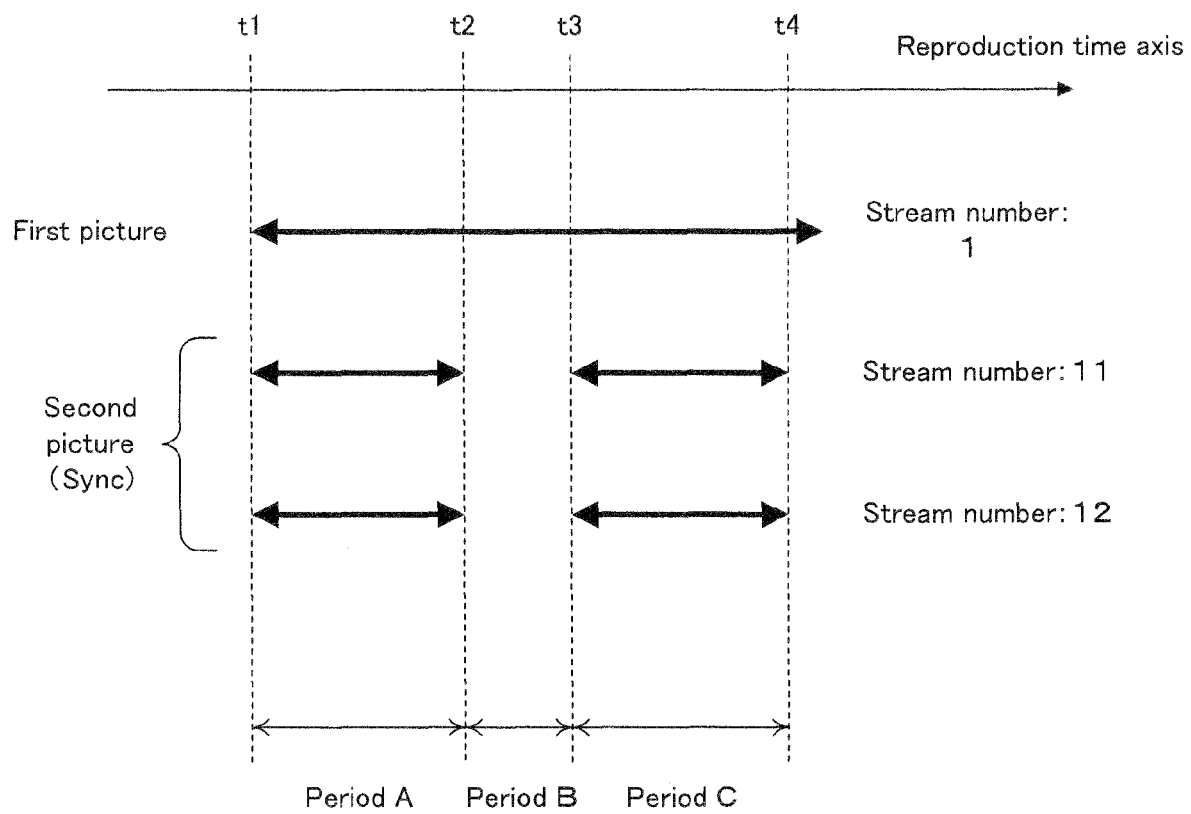
FIG. 6 is a timing chart conceptually showing a flow of the display of the first picture and the second picture along a time axis when the second picture of a Sync type is superimposed and displayed on the first picture.
Figure 7:
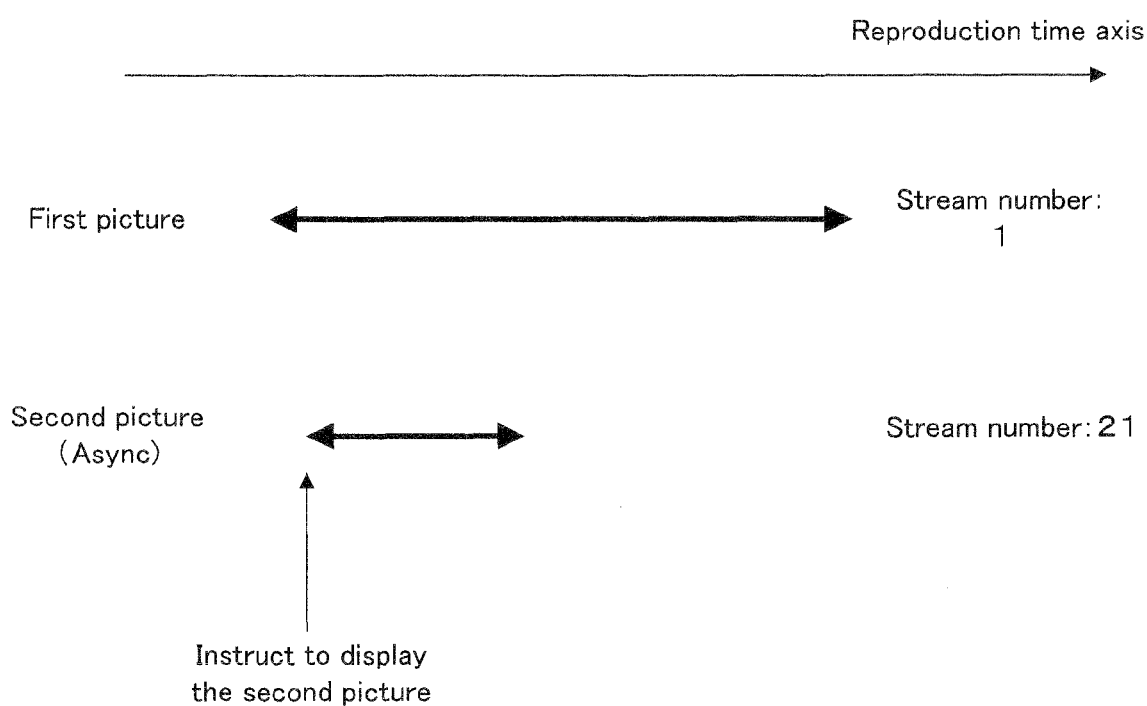
FIG. 7 is a timing chart conceptually showing a flow of the display of the first picture and the second picture along the time axis when the second picture of the Sync type is superimposed and displayed on the first picture.
Figure 8:
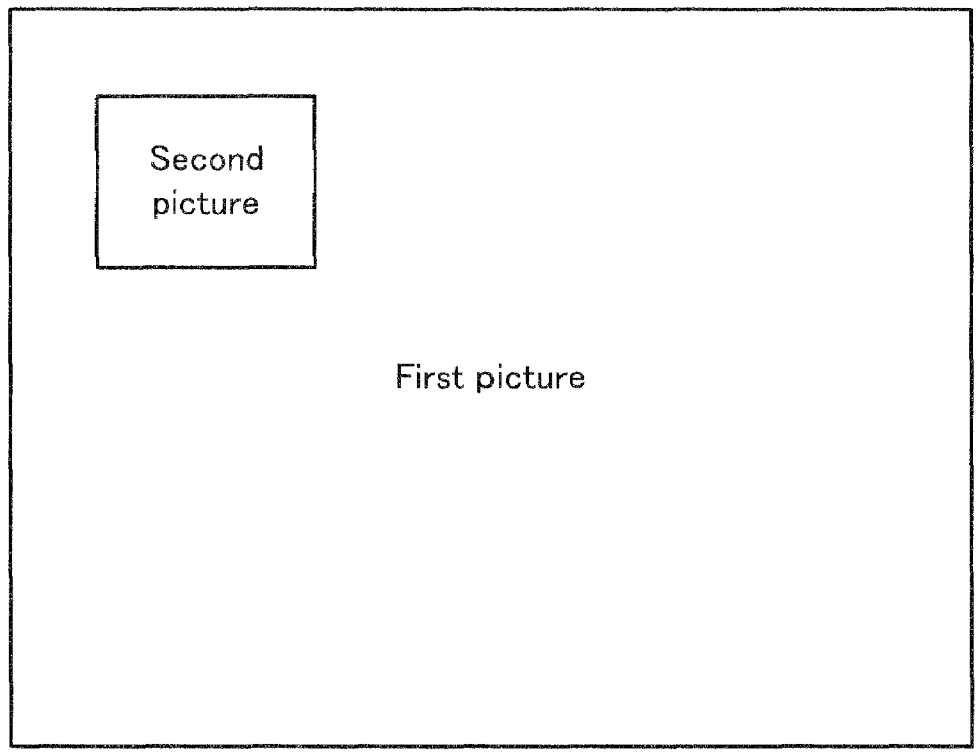
FIG. 8 is a plan view conceptually showing the second picture which is superimposed and displayed on the first picture.

Next, with reference to FIG. 5 to FIG. 8, a more specific description will be given on an aspect of the display of a second picture and the logical structure of the play list 30 in employing PinP in which the second picture, which is a sub-picture, is superimposed and displayed (in other words, reproduced) on at least one portion of a first picture, which is a main picture, of the AV content. FIG. 5 is a data structure diagram conceptually showing the logical structure of the play list in employing PinP in which the second picture, which is the sub-picture, is superimposed and displayed on at least one portion of the first picture, which is the main picture. FIG. 6 is a timing chart conceptually showing a flow of the display of the first picture and the second picture along a time axis when the second picture of a Sync type is superimposed and displayed on the first picture. FIG. 7 is a timing chart conceptually showing a flow of the display of the first picture and the second picture along the time axis when the second picture of the Async type is superimposed and displayed on the first picture. FIG. 8 is a plan view conceptually showing the second picture which is superimposed and displayed on the first picture.

As shown in FIG. 5, the play list 30 in employing PinP includes one or a plurality of play items 31 (#1 to #p: wherein p is an integer of 1 or more) including information about the first picture and information about the second picture.

The play item 31 includes a pointer to an AV content file corresponding to the first picture and stream number information about the first picture. For example, in the example shown in FIG. 5, the play item 31 specifies streams with the stream number #1 to the stream number #i as the first picture. Incidentally, the reproduction start time point and the reproduction end time point shown in FIG. 3 are preferably defined in each stream, which are not illustrated.

Moreover, the play item 31 includes a pointer to an AV content file corresponding to the second picture and stream number information about the second picture, in addition to the stream number information about the first picture. For example, in the example shown in FIG. 5, the play item 31 specifies streams with the stream number #i+1 to the stream number #k as the second picture.

In particular, in the example, as the second picture, there are a second picture of a Sync type and a second picture of an Async type, in accordance with its display method. In the second picture of the Sync type, the display start time point and the display end time point are set in advance on the basis of the reproduction time point of the first picture. On the other hand, in the second picture of the Async type, the reproduction can be started at an arbitrary reproduction time point in accordance with an instruction of a user or the like. In the example shown in FIG. 5, streams with the stream number i+1 to the stream number #j are specified as the second picture of the Sync type, and streams with the stream number #j+1 to the stream number #k are specified as the second picture of the Async type.

As described above, by including one or a plurality of play items 31, which include(s) the information about the first picture and the information about the second picture, it is possible to reproduce another stream that is not multiplexed in the clip for the first picture, in synchronization with the stream for the first picture.

Specifically, in case of the second picture of the Sync type, as shown in FIG. 6, while the first picture with the stream number #1 is reproduced, the second picture with the stream number #11 or #12 is reproduced in parallel. The stream numbers of the first picture and the second picture which are the display targets are stored into the memory 355 or the memory 360, which constitutes one specific example of the "storing device" of the present invention. For example, if the second picture with the stream number #11 is reproduced in parallel while the first picture with the stream number #1 is reproduced, the stream number #1 and the stream number #11 are stored into the memory 355 or the memory 360.

The reproduction of the second picture with the stream number #11 or #12 starts at a reproduction time point t1 and ends at a reproduction time point t2. After that, the reproduction starts at a reproduction time point t3, and the reproduction ends at a reproduction time point t4. Therefore, if a user gives an instruction to display the second picture in a period A between the reproduction time point t1 and the reproduction time point t2 and a period C between the reproduction time point t3 and the reproduction time point t4, the second picture is displayed on a display. Moreover, if the user gives an instruction to display the second picture in a period B between the reproduction time point t2 and the reproduction time point t3, the second picture is displayed on the display at the reproduction time point t3 after the instruction.

At this time, under the control of the CPU 354 or the CPU 359, which constitutes one specific example of the "third controlling device" of the present invention, the stream number of the second picture continues to be stored in the memory 355 or the memory 360 even if the reproduction of the second picture is ended at the reproduction time point t2. For example, if the second picture with the stream number #11 is being reproduced, the stream number #11 continues to be stored in the memory 355 or the memory 360 even in the period B after the reproduction time point t2. As a result, the second picture with the stream number #11 is automatically reproduced at the reproduction time point t3.

Alternatively, in case of the second picture of the Async type, as shown in FIG. 7, if the user gives an instruction to display the second picture with the stream number #21, the second picture with the stream number #21 is displayed in parallel with the first picture with the stream number #1, regardless of the reproduction time point at which the instruction is given. If the user gives an instruction to end the display of the second picture or if the reproduction period of the second picture is over, the display of the second picture is ended. If the second picture of the Async type is reproduced, the stream number continues to be stored in the memory 355 or the memory 360 or is destroyed, according to a flow shown in FIG. 9.

As a result, as shown in FIG. 8, a small window of the second picture is superimposed and displayed simultaneously on one portion of the first picture.

Incidentally, in the example, the memory 355 or the memory 360 stores therein one stream number of the first picture and one stream number of the second picture. That is, a plurality of stream numbers of the first pictures are not stored in the memory 355 or the memory 360. In the same manner, a plurality of stream numbers of the second pictures are not stored in the memory 355 or the memory 360. However, it may be constructed such that the plurality of stream numbers of the first pictures are stored in the memory 355 or the memory 360. In the same manner it may be constructed such that the plurality of stream numbers of the second pictures are stored in the memory 355 or the memory 360.

(3) Operation Principle of Information Recording/Reproducing Apparatus

Figure 9:
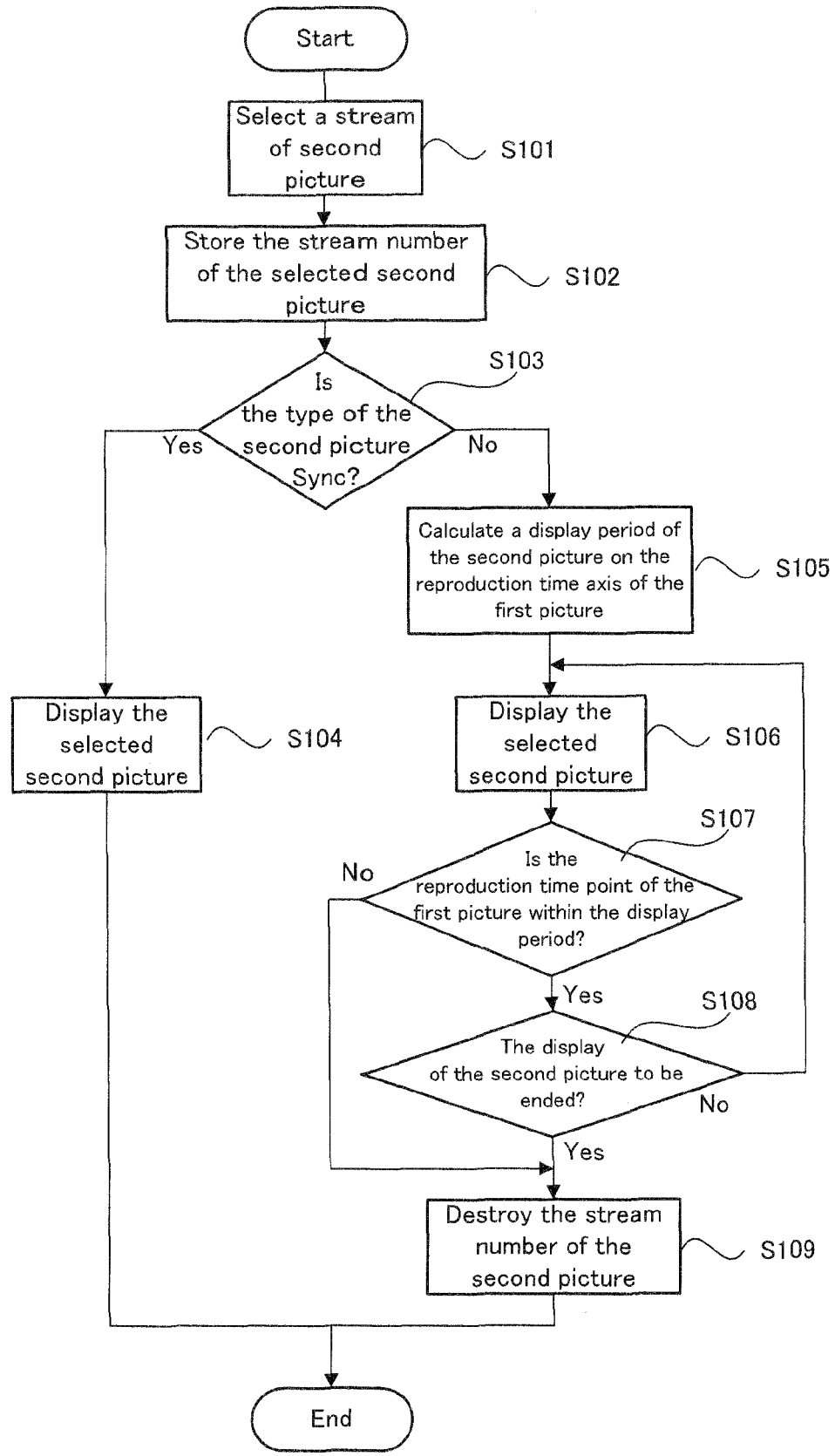
FIG. 9 is a flow chart conceptually showing a flow of the operation of the information recording/reproducing apparatus in the example.
Figure 10:
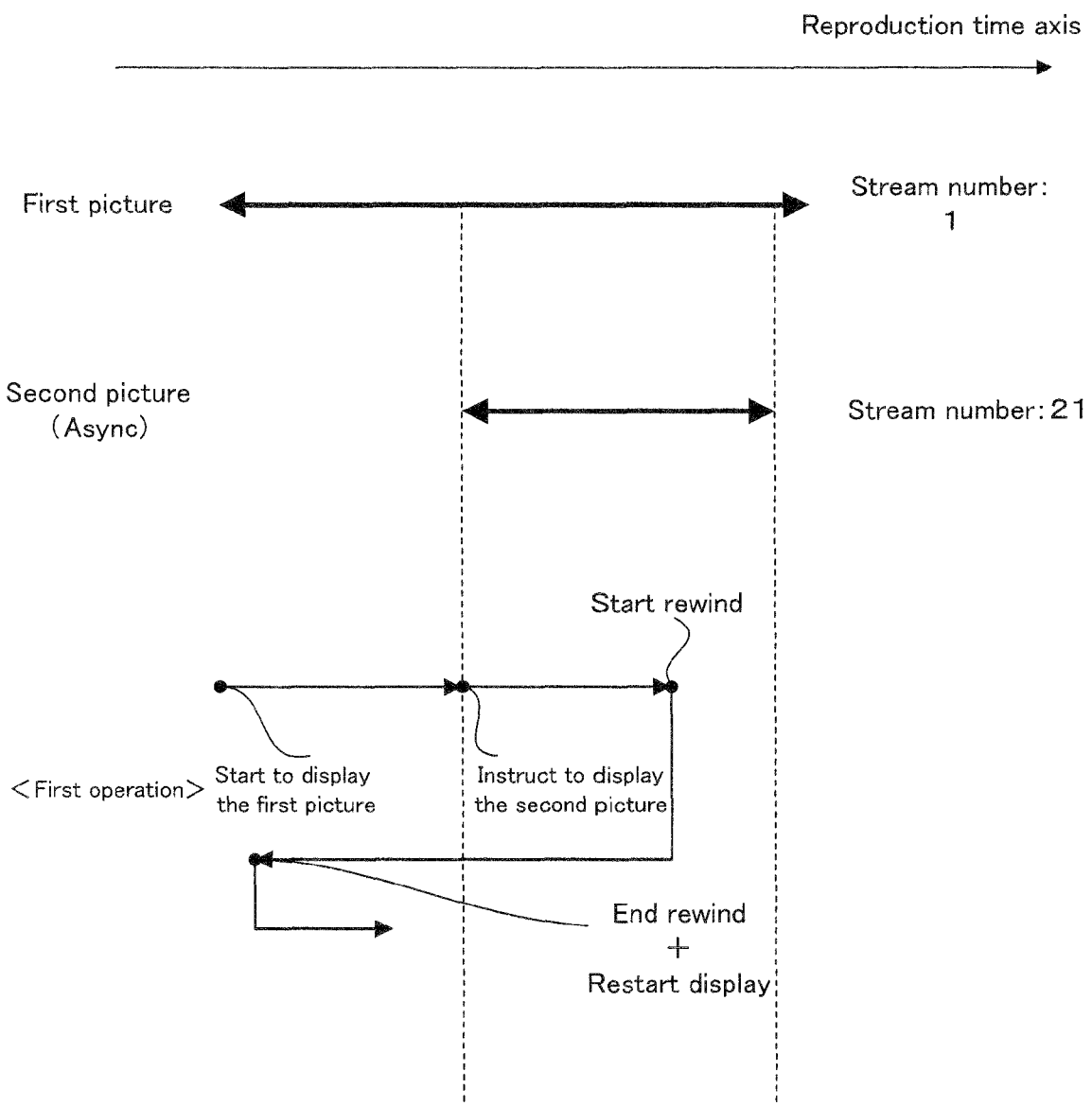
FIG. 10 is a timing chart conceptually showing one flow of the display of the first picture and the second picture along the time axis, if a user performs a rewind operation when the second picture of an Async type is superimposed and displayed on the first picture.
Figure 11:
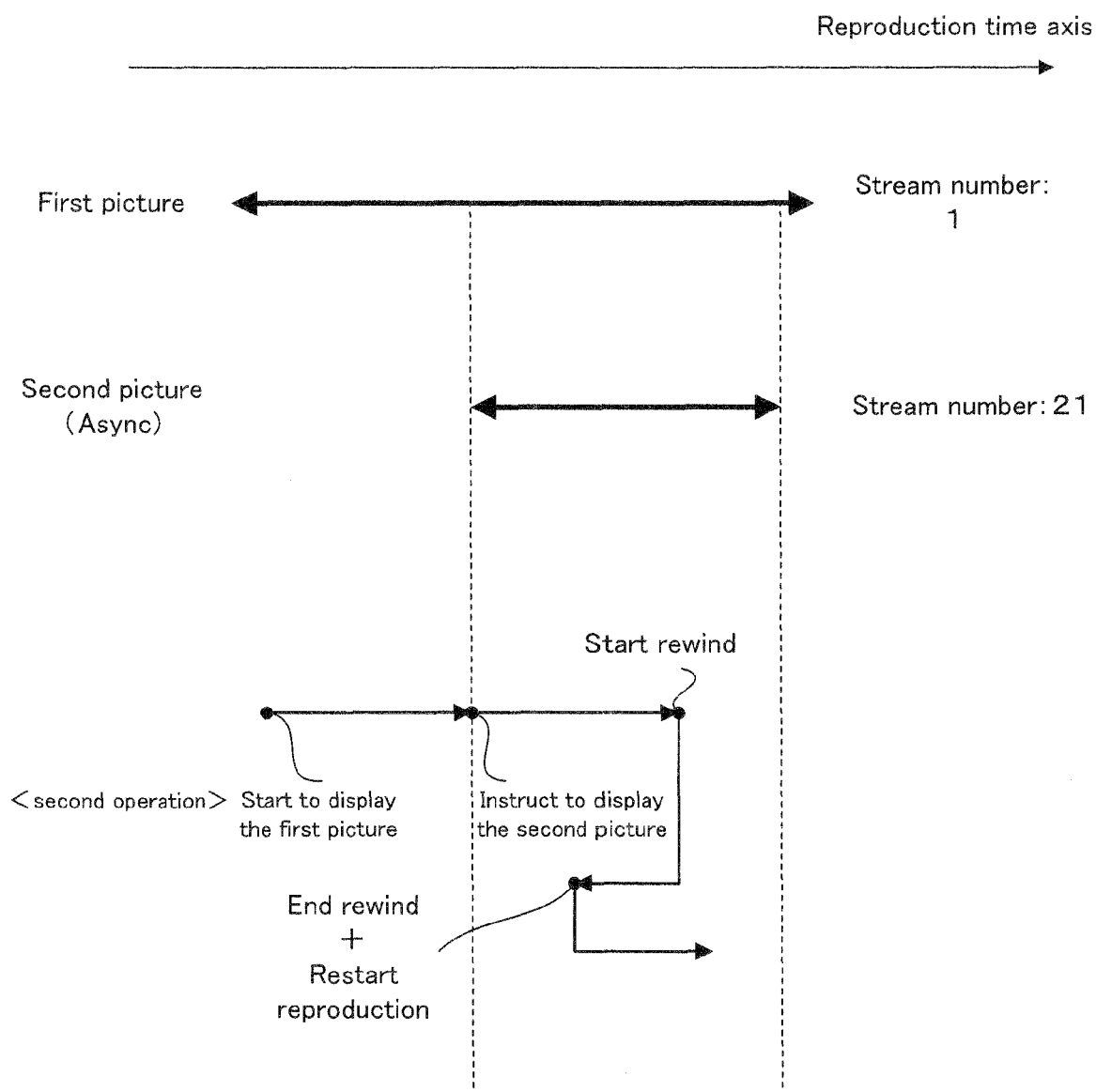
FIG. 11 is a timing chart conceptually showing another flow of the display of the first picture and the second picture along the time axis, if the user performs the rewind operation when the second picture of the Async type is superimposed and displayed on the first picture.

Next, with reference to FIG. 9 to FIG. 11, a description will be given on the more detailed aspect of the reproduction operation (specifically, the aspect of the operation of displaying the second picture) of the information recording/reproducing apparatus 200 in the example. FIG. 9 is a flow chart conceptually showing a flow of the operation of the information recording/reproducing apparatus in the example. FIG. 10 is a timing chart conceptually showing one flow of the display of the first picture and the second picture along the time axis if a user performs a rewind operation when the second picture of the Async type is superimposed and displayed on the first picture. FIG. 11 is a timing chart conceptually showing another flow of the display of the first picture and the second picture along the time axis if the user performs the rewind operation when the second picture of the Async type is superimposed and displayed on the first picture.

Incidentally, the flowchart shown in FIG. 9 indicates the operation of display the second picture when the title (in other words, the AV content) to be reproduced has been already selected by the user and the first picture included in the title is displayed.

As shown in FIG. 9, the stream of the second picture is selected by the user (step S101). In other words, the second picture to be superimposed and displayed on the first picture is selected. At this time, the stream number of the second picture selected is stored into the memory 355 or the memory 360 (step S102).

After that, under the control of the CPU 354 or the CPU 359 which constitutes one specific example of the "first judging device" of the present invention, it is judged whether or not the type of the second picture selected is the Sync type (step S103).

As a result of the judgment in the step S103, if it is judged that the type of the second picture is the Sync type (the step 103: Yes), as explained in FIG. 6, the second picture of the Sync type selected is reproduced (step S104). As a result, as explained in FIG. 8, the second picture is superimposed and displayed on the first picture. At this time, as described above, under the control of the CPU 354 or the CPU 359 which constitutes one specific example of the "third controlling device" of the present invention, the stream number of the second picture of the Sync type continues to be stored in the memory 355 or the memory 360.

On the other hand, as a result of the judgment in the step S103, if it is judged that the type of the second picture is not the Sync type (the step 103: No), a display period (in other words, a reproduction period) of the second picture on the reproduction time axis of the first picture is calculated (step S105). The display period of the second picture calculated here is a range from the reproduction start time point (in other words, the display start time point) of the second picture to a reproduction time point after a lapse of time to display the second picture.

After that, as explained in FIG. 7, the second picture of the Async type selected is reproduced (step S106). As a result, as explained in FIG. 8, the second picture is superimposed and displayed on the first picture.

Then, under the control of the CPU 354 or the CPU 359 which constitutes one specific example of the "second judging device" of the present invention, it is judged whether or not the current reproduction time point of the first picture is within the display period of the second picture calculated in the step S105 (step S107). More specifically, if the current reproduction time point of the first picture is T and the display period of the second picture is T1 to T2, it is judged whether or not $T1 \leq T \leq T2$. If $T1 \leq T \leq T2$, it is judged that the current reproduction time point of the first picture is within the display period of the second picture calculated in the step S105. On the other hand, if $T<T1$ or $T2<T$, it is judged that the current reproduction time point of the first picture is not within the display period of the second picture calculated in the step S105.

As a result of the judgment in the step S107, if it is judged that the current reproduction time point of the first picture is within the display period of the second picture calculated in the step S105 (the step S107: Yes), then it is judged whether or not the display of the second picture is to be ended (step S108). More specifically, it is judged whether or not the user has given an instruction to end the display of the second picture.

As a result of the judgment in the step S108, if it is judged that the display of the second picture is to be ended (the step S108: Yes), the stream number stored in the memory 355 or the memory 360 is destroyed, under the control of the CPU 354 or the CPU 359 which constitutes one specific example of the "fourth controlling device" of the present invention (step S109). Specifically, the stored stream number may be deleted, or instead of the stored stream number, a flag or value which indicates invalidity of the stream number or the like may be stored into the memory 355 or the memory 360.

On the other hand, as a result of the judgment in the step S108, if it is judged that the display of the second picture is not to be ended (the step S108: No), the operational flow returns to the step S106 again to continue the operation after the step S106. In this case, under the control of the CPU 354 or the CPU 359 which constitutes one specific example of the "second controlling device" of the present invention, the stream number stored in the memory 355 or the memory 360 continues to be stored as it is.

On the other hand, as a result of the judgment in the step S107, if it is judged that the current reproduction time point of the first picture is not within the display period of the second picture calculated in the step S105 (the step S107: No), the stream number stored in the memory 355 or the memory 360 is destroyed, under the control of the CPU 354 or the CPU 359 which constitutes one specific example of the "first controlling device" of the present invention (step S109).

Now, a specific explanation is given by using timing charts. As shown in FIG. 10, after the display of the first picture is started, the user gives an instruction to start the display of the second picture. At this time, it is assumed that the user gives an instruction to rewind the first picture. According to a first operation, a reproduction time point at which the user gives an instruction to end the rewind is before the display start time point of the second picture. That is, the reproduction time point at which the user gives the instruction to end the rewind is not within the display period of the second picture. Therefore, in this case, the stream number stored in the memory 355 or the memory 360 is destroyed. Thus, at the time point at which the display of the first picture is started after the rewind is ended, the stream number is not stored in the memory 355 or the memory 360. Thus, only the first picture is displayed and the second picture is not displayed. As described above, it is possible to preferably suppress or prevent a disadvantage of displaying the second picture at an unexpected reproduction time point, by destroying the stream number stored in the memory 355 or the memory 360 when it is judged that the current reproduction time point of the first picture is not within the display period of the second picture.

On the other hand, as shown in FIG. 11, according to a second operation, the reproduction time point at which the user gives the instruction to end the rewind is within the display period of the second picture. Therefore, in this case, the stream number that has been stored in the memory 355 or the memory 360 continues to be stored as it is. Thus, at the time point at which the display of the first picture is started after the rewind is ended, the second picture is superimposed and displayed on the first picture. In this case, the reproduction time point at which the instruction is given to end the rewind is originally the reproduction time point to display the second picture, so that displaying the second picture is no problem.

As explained above, according to the information recording/reproducing apparatus 200 in the example, in accordance with (1) whether the type of the second picture, which is the sub-picture, is of the Sync type or of the Async type, and further (2) whether or not the current reproduction time point of the first picture, which is the main picture, is within the display period of the second picture, it is possible to determine whether the stream number stored in the memory 355 or the memory 360 continues to be held or is destroyed. Thus, it is possible to preferably suppress or eliminate such a disadvantage that the second picture is displayed at an unexpected reproduction time point or undesired reproduction time point, which can be a problem particularly in displaying the second picture of the Async type.

As described above, according to the information recording/reproducing apparatus 200 in the example, it is possible to preferably display the second picture, which is the sub-picture, superimposed and displayed on the first picture, which is the main picture.

Incidentally, in the aforementioned example, an explanation is given on the optical disc 100 as one example of the information recording medium and the player related to the optical disc 100 as one example of the information reproducing apparatus; however, the present invention is not limited to the optical disc and the player for the optical disc, and it can be also applied to other various information recording media which support high-density recording or high transmission rate, and players for the various information recording media.

Moreover, obviously, not only the information recording/reproducing apparatus for reproducing the AV content(s) recorded on the topical disc 100 but also an information recording/reproducing apparatus for reproducing the AV content(s) received through a wired line or wireless line, such as TV broadcasting and the Internet, can receive the aforementioned various benefits by performing the aforementioned operations.

INDUSTRIAL APPLICABILITY

The information reproducing apparatus and method, and the computer program according to the present invention can be applied to an information reproducing apparatus, such as a DVD player. Moreover, they can be applied to an information reproducing apparatus or the like which is mounted on various computer equipment for consumer use or for commercial use, or which can be connected to various computer equipment.

The invention claimed is:

1. An information reproducing apparatus for reproducing information recorded on an information recording medium,
the information recording medium comprising:
content information including (i) main picture stream and (ii) sub-picture stream of an asynchronous type, wherein (iii-1) the sub-picture stream of the asynchronous type is superimposed and displayed on the main picture stream, (iii-2) a reproduction time point to start the display of the sub-picture stream of the asynchronous type is not set in advance based on a reproduction time axis of the main picture stream and (iii-3) displaying of the sub-picture stream of the asynchronous type can be started at an arbitrary reproduction time point in accordance with an external instruction;
clip information indicating address information of each stream of the content information; and
play list information indicating a reproduction start time point and a reproduction end time point of the main picture stream and indicating an access point in the clip information which indicates the address information of each stream,
the information reproducing apparatus comprising:
a displaying and outputting device for displaying and outputting the main picture stream and the sub-picture stream of the asynchronous type;
a storing device for storing an identification number of the sub-picture stream of the asynchronous type selected to be superimposed and displayed on the main picture stream, wherein (i) the identification number of the sub-picture stream is stored in the storing device when the sub-picture stream is set as a displayable target for the display and outputting device and (ii) the display and outputting device starts to display and output the sub-picture stream, which is indicated by the identification number stored in the storing device, in accordance with the external instruction; and
a controlling device for controlling said storing device to destroy the identification number of the sub-picture stream of the asynchronous type, upon a current reproduction time point of the main picture stream being beyond a range of reproduction time points in which the sub-picture stream of the asynchronous type is to be displayed; and
for controlling said storing device to continue to store the identification number of the sub-picture stream of the asynchronous type, upon the current reproduction time point of the main picture stream not being beyond the range of reproduction time points in which the sub-picture stream of the asynchronous type is to be displayed,
wherein said controlling device controls said storing device to destroy the identification number of the sub-picture stream of the asynchronous type, upon (i) a rewind of the main picture stream being performed after the sub-picture stream of the asynchronous type is displayed in accordance with the external instruction and (ii) a reproduction time point at which the rewind of the main picture stream is ended is before a reproduction time point at which the display of the sub-picture stream of the asynchronous type is started.

2. The information reproducing apparatus according to claim 1, wherein said controlling device controls said storing device to destroy the identification number of the sub-picture stream of the asynchronous type, upon the current reproduction time point of the main picture stream being beyond the range of reproduction time points in which the sub-picture stream of the asynchronous type is to be displayed, after the sub-picture stream of the asynchronous type is superimposed and displayed on the main picture stream.

3. The information reproducing apparatus according to claim 1, wherein said controlling device controls said storing device to continue to store the identification number of the sub-picture stream of the asynchronous type, upon the current reproduction time point of the main picture stream not being beyond the range of reproduction time points in which the sub-picture stream of the asynchronous type is to be displayed, after the sub-picture stream of the asynchronous type is superimposed and displayed on the main picture stream.

4. The information reproducing apparatus according to claim 1, wherein
said displaying and outputting device displays and outputs a sub-picture stream of a synchronous type, wherein (i) the sub-picture stream of the synchronous type is superimposed and displayed on the main picture stream and (ii) a reproduction time point to start the display of the sub-picture stream of the synchronous type is set in advance with respect to the reproduction time axis of the main picture stream,
said storing device stores the identification number of the sub-picture stream of the asynchronous type or the sub-picture stream of the synchronous type, which is selected to be superimposed and displayed on the main picture stream, and
the controlling device controls said storing device to continue to store the identification number of the sub-picture stream of the synchronous type, upon the sub-picture stream of the second type being superimposed and displayed on the main picture stream.

5. The information reproducing apparatus according to claim 4, further comprising a first judging device for judging whether the sub-picture stream of the asynchronous type is selected as the sub-picture stream to be superimposed and displayed on the main picture stream or the sub-picture stream of the synchronous type is selected as the sub-picture to be superimposed and displayed on the main picture stream.

6. The information reproducing apparatus according to claim 1, further comprising a second judging device for judging whether or not the current reproduction time point of the main picture stream is beyond the range of reproduction time points in which the sub-picture stream of the asynchronous type is to be displayed, upon the sub-picture stream of the asynchronous type being superimposed and displayed on the main picture stream.

7. The information reproducing apparatus according to claim 1, wherein the controlling device controls said storing device to destroy the identification number of the sub-picture stream of the asynchronous type, upon the display of the sub-picture stream of the asynchronous type ending after the sub-picture stream of the asynchronous type is superimposed and displayed on the main picture stream.

8. The information reproducing apparatus according to claim 1, wherein the range of reproduction time points in which the sub-picture stream of the asynchronous type is to be displayed is a range from a reproduction time point at which the display of the sub-picture stream of the asynchronous type is started to a reproduction time point after a lapse of a display period of the sub-picture stream of the asynchronous type.

9. The information reproducing apparatus according to claim 1, wherein said controlling device controls said storing device to destroy the identification number of the sub-picture stream of the asynchronous type by storing an invalid value into said storing device.

10. An information reproducing method in an information reproducing apparatus for reproducing information recorded on an information recording medium, the information recording medium comprising:

content information including (i) main picture stream and (ii) sub-picture stream of an asynchronous type, wherein (iii-1) the sub-picture stream of the asynchronous type is superimposed and displayed on the main picture stream, (iii-2) a reproduction time point to start the display of the sub-picture stream of the asynchronous type is not set in advance based on a reproduction time axis of the main picture stream and (iii-3) displaying of the sub-picture stream of the asynchronous type can be started at an arbitrary reproduction time point in accordance with an external instruction;

clip information indicating address information of each stream of the content information; and play list information indicating a reproduction start time point and a reproduction end time point of the main picture stream and indicating an access point in the clip information which indicates the address information of each stream, the information reproducing apparatus comprising:

a displaying and outputting device for displaying and outputting the main picture stream and the sub-picture stream of the asynchronous type; and a storing device for storing an identification number of the sub-picture stream of the asynchronous type selected to be superimposed and displayed on the main picture stream, wherein (i) the identification number of the sub-picture stream is stored in the storing device when the sub-picture stream is set as a displayable target for the display and outputting device and (ii) the display and outputting device starts to display and output the sub-picture stream, which is indicated by the identification number stored in the storing device, in accordance with the external instruction, said information reproducing method comprising:

a first controlling process of controlling said storing device to destroy the identification number of the sub-picture stream of the asynchronous type, upon a current reproduction time point of the main picture stream being beyond a range of reproduction time points in which the sub-picture stream of the asynchronous type is to be displayed; and a second controlling process of controlling said storing device to continue to store the identification number of the sub-picture stream of the asynchronous type, upon the current reproduction time point of the main picture stream not being beyond the range of reproduction time points in which the sub-picture stream of the asynchronous type is to be displayed, wherein said first controlling process controls said storing device to destroy the identification number of the sub-picture stream of the asynchronous type, upon (i) a rewind of the main picture stream being performed after the sub-picture stream of the asynchronous type is displayed in accordance with the external instruction and (ii) a reproduction time point at which the rewind of the main picture stream is ended is before a reproduction time point at which the display of the sub-picture stream of the asynchronous type is started.

11. A non-transitory computer-readable medium recording thereon a computer program of instructions executable by a computer provided in the information reproducing apparatus according to claim 1, said computer program making the computer function as at least one portion of said controlling device.

* * * * *